(12) United States Patent
Jeong et al.

(10) Patent No.: US 9,366,901 B2
(45) Date of Patent: Jun. 14, 2016

(54) TRANSPARENT LIQUID CRYSTAL DISPLAY DEVICE WITH ENHANCED LIGHTING ARRANGEMENT

(75) Inventors: Haehyeon Jeong, Gyeongbuk (KR); Jaebum Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 13/545,847

(22) Filed: Jul. 10, 2012

(65) Prior Publication Data
US 2013/0016307 A1 Jan. 17, 2013

(30) Foreign Application Priority Data
Jul. 11, 2011 (KR) .................. 10-2011-0068474

(51) Int. Cl.
G02F 1/1335 (2006.01)
G02F 1/137 (2006.01)
G02F 1/1333 (2006.01)

(52) U.S. Cl.
CPC ...... *G02F 1/133615* (2013.01); *G02F 1/13718* (2013.01); *G02F 1/133512* (2013.01); *G02F 2001/13332* (2013.01); *G02F 2001/133314* (2013.01)

(58) Field of Classification Search
USPC .......................................................... 349/16
See application file for complete search history.

(56) References Cited

U.S. PATENT DOCUMENTS

| | | | | |
|---|---|---|---|---|
| 5,197,242 A | * | 3/1993 | Baughman | B32B 17/10045 349/16 |
| 5,686,979 A | * | 11/1997 | Weber et al. | 349/96 |
| 2004/0032675 A1 | * | 2/2004 | Weller et al. | 359/872 |
| 2004/0160538 A1 | * | 8/2004 | Li et al. | 349/16 |
| 2005/0141245 A1 | * | 6/2005 | Sugahara | G02F 1/133308 362/633 |
| 2007/0263134 A1 | * | 11/2007 | Kim et al. | 349/54 |
| 2008/0136335 A1 | * | 6/2008 | Chen et al. | 315/158 |
| 2008/0143896 A1 | * | 6/2008 | Yurth | 349/16 |
| 2009/0147174 A1 | * | 6/2009 | Ha et al. | 349/58 |
| 2009/0244413 A1 | * | 10/2009 | Ishikawa et al. | 349/12 |
| 2009/0316064 A1 | * | 12/2009 | Kono et al. | 349/58 |

(Continued)

FOREIGN PATENT DOCUMENTS

| | | |
|---|---|---|
| CN | 101197108 A | 6/2008 |
| JP | 08-171806 | 7/1996 |

(Continued)

OTHER PUBLICATIONS

Japanese Patent Office, Office Action, Japanese Patent Application No. 2012-155578, Nov. 26, 2013, six pages.

(Continued)

*Primary Examiner* — Ryan Crockett
(74) *Attorney, Agent, or Firm* — Fenwick & West LLP (57) ABSTRACT

A liquid crystal display (LCD) device module capable of implementing a transparent display using reflection and transmission properties of cholesteric liquid crystal includes a liquid crystal display panel, a backlight unit disposed at one side surface of the liquid crystal panel to emit light directly to the side surface, and a supporting structure to support and secure the liquid crystal display panel and the backlight unit. A light guide plate is not provided at a rear surface of the liquid crystal display panel. A backlight unit faces the side surface of the liquid crystal display panel so that light can be incident directly onto the liquid crystal panel to generate an image, resulting in image enhanced with visibility and transparency of the liquid crystal display panel.

10 Claims, 4 Drawing Sheets

(56) References Cited

U.S. PATENT DOCUMENTS

| | | | |
|---|---|---|---|
| 2010/0011637 A1* | 1/2010 | Zhang | 40/442 |
| 2011/0102701 A1* | 5/2011 | Teng | G02F 1/133308 349/58 |
| 2011/0128463 A1* | 6/2011 | Ji et al. | 349/58 |
| 2013/0044276 A1* | 2/2013 | Lee | G02F 1/133615 349/62 |

FOREIGN PATENT DOCUMENTS

| | | |
|---|---|---|
| JP | 10-0186361 | 7/1998 |
| JP | H11-38411 A | 2/1999 |
| JP | 2000-305065 A | 11/2000 |
| JP | 2001-5053 A | 1/2001 |
| JP | 2001-005053 A | 1/2001 |
| JP | 2002-541515 A | 12/2002 |
| JP | 2006-194928 A | 7/2006 |
| JP | 2007-094254 A | 4/2007 |
| KR | 10-2004-0084492 | 10/2004 |
| WO | WO 00/60407 | 10/2000 |
| WO | WO 2008/107958 A1 | 9/2008 |
| WO | WO 2010/092791 A1 | 8/2010 |

OTHER PUBLICATIONS

Chinese First Office Action, Chinese Application No. 201210240608.2, Jul. 2, 2014, 12 pages.

* cited by examiner

FIG. 1A

PRIOR ART

FIG. 1B

PRIOR ART

TRANSPARENT LIQUID CRYSTAL DISPLAY DEVICE WITH ENHANCED LIGHTING ARRANGEMENT

CROSS-REFERENCE TO RELATED APPLICATION

This application claims the benefit of Korean Patent Application No. 10-2011-0068474, filed on Jul. 11, 2011, which is incorporated by reference herein in its entirety.

BACKGROUND OF THE INVENTION

1. Field of the Invention

This specification relates to a liquid crystal display device module, and particularly, to a liquid crystal display device module capable of implementing a transparent display using reflection and transmittance properties of Cholesteric Liquid Crystal (CLC).

2. Background of the Invention

A Liquid Crystal Display (LCD) device is a flat panel display device which includes electrode lines aligned in the form of lattice on two transparent substrates facing each other, a liquid crystal display (LCD) panel with liquid crystal interposed between the substrates, a light source for emitting light to the LCD panel. Especially, cholesteric liquid crystal (CLC) has a plurality of thin molecular layers, in which molecules are aligned in a direction of a longer axis and whose surfaces are in parallel to one another so as to generally form a helical structure. When the cholesteric liquid crystal is used as the liquid crystal in the LCD panel, the LCD panel is allowed to have properties of selectively reflecting or transmitting light. Therefore, the use of the cholesteric liquid crystal is advantageous in implementing a transparent display.

However, in spite of those advantages, the LCD must have a separate light source because it does not emit light by itself, and accordingly, a non-transparent backlight unit is required at a rear surface of the LCD panel. Especially, a light guide plate included in the backlight unit serves to guide light when the liquid crystal of the LCD panel is driven so as to be evenly distributed on an entire region of the LCD panel, thereby increasing luminance of an image. However, the light guide plate itself lowers transparency of the LCD panel, which makes it difficult to implement a transparent display.

Figure 1A:
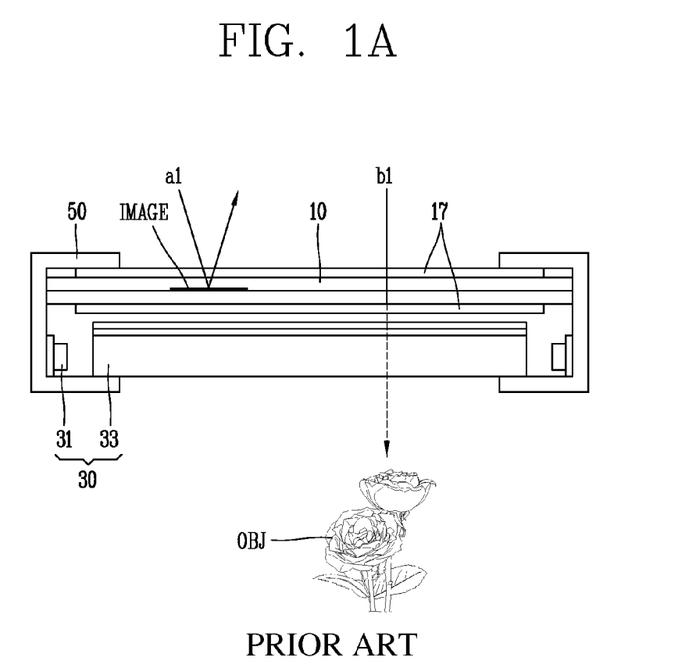
FIGS. 1A and 1B are schematic views showing reflection and transmittance properties of a transparent display according to a related art.
Figure 1B:
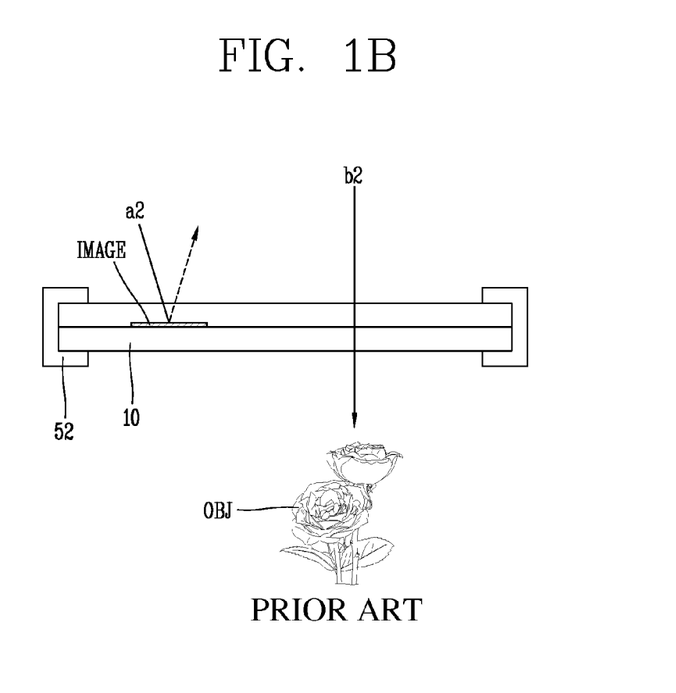

FIGS. 1A and 1B schematically show reflection and transmittance properties according to a module type of a transparent display according to the related art.

As shown in FIG. 1A, the related art transparent display may include an LCD panel 10, a backlight unit 30 for emitting light to a rear surface of the LCD panel 10, and a supporting structure 50 for securing those components to be modularized.

The transparent display having the configuration transfers light emitted from a light source 31 to the LCD panel 10 using a light guide plate and an optical sheets 33. The light functions as ambient light which facilitates an observer to identify an image (IMAGE) generated on the LCD panel 10 by a reflected light 1a. On the contrary, the light guide plate, the optical sheet 33 and polarizing films 17 attached on both surfaces of the LCD panel 10 lower the transparency of the LCD panel 10, and accordingly an incident light b1 is rarely transmitted through the LCD panel 10. As a result, it is difficult for the observer to identify an object (OBJ) located at a rear surface of the transparent display.

As a structure proposed for overcoming the disadvantage, FIG. 1B shows an example of removing the light guide plate and other optical members to increase transparency of the LCD panel 10. As shown in FIG. 1B, a transparent display with this configuration includes an LCD panel 10 formed the same as that shown in FIG. 1A. However, the LCD panel 10 does not have the polarizing films (17 in FIG. 1A) attached on both surfaces of the LCD panel 10 and the backlight unit (30 in FIG. 1A), merely supported and secured by the supporting structure 52.

Accordingly, most of light b2 incident onto the LCD panel 10 is transmitted through the LCD panel 10 without absorption and reaches the object OBJ located behind the transparent display. The observer can accordingly easily identify the object OBJ. However, it is difficult for the observer to identify the image (IMAGE) generated on the LCD panel 10 because of there is no ambient light from a light source.

SUMMARY OF THE INVENTION

Therefore, to address such drawbacks of the related art, an aspect of the detailed description is to provide a liquid crystal display (LCD) device module having an enhanced visibility of an image by solving a problem that degrees of identifying a reflection image and a transmission image vary according to presence or non-presence of a backlight unit in an LCD device having a transparent display, which is implemented using cholesteric liquid crystal, and a supporting structure included therein.

To achieve these and other advantages and in accordance with the purpose of this specification, as embodied and broadly described herein, there is provided a liquid crystal display device module including a liquid crystal pane, a backlight unit disposed at at least one side surface of the liquid crystal panel to emit light directly to the side surface, and a supporting structure to support and secure the liquid crystal panel and the backlight unit, wherein the backlight unit may be disposed in a space surrounded by the supporting structure and the at least one side surface of the liquid crystal display panel.

The supporting structure may include a top case to cover front edge portions of the liquid crystal panel, and a guide panel to cover rear edge portions of the liquid crystal panel and having the backlight unit mounted thereon to face the side surface of the liquid crystal panel, the guide panel being mechanically coupled to the top case.

The supporting structure may include a light shielding tape to secure the top case to the liquid crystal panel.

The backlight unit may include one or more light sources, and a Light Emitting Diode (LED) array on which the light sources are aligned in series.

The backlight unit may further include a lamp housing on which the light sources and the LED array are mounted, and the lamp housing may reflect light emitted from the light sources toward the side surface of the liquid crystal panel.

The liquid crystal layer may implement a first state of transmitting light incident from one surface thereof to the other surface according to an electric field formed, and a second state of scattering and reflecting light incident from one surface thereof.

The liquid crystal panel may include a lower substrate, an upper substrate facing the lower substrate, and a cholesteric liquid crystal layer interposed between the lower substrate and the upper substrate.

The first state may indicate that the cholesteric liquid crystal layer is in a planar state, and the second state may indicate that the cholesteric liquid crystal layer is in a focal conic state.

Without a light guide plate which was disposed on a rear surface of the LCD panel, a backlight unit may face a side surface of the LCD panel so as to emit light directly to the LCD panel, thereby generating an image. Therefore, visibility of the image can be enhanced, and transparency of the LCD panel can be improved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of an LCD device module implementing a transparent display and a supporting structure included therein in accordance with the exemplary embodiments, with reference to the accompanying drawings. For the sake of brief description with reference to the drawings, the same or equivalent components will be provided with the same reference numbers, and description thereof will not be repeated.

Figure 2:
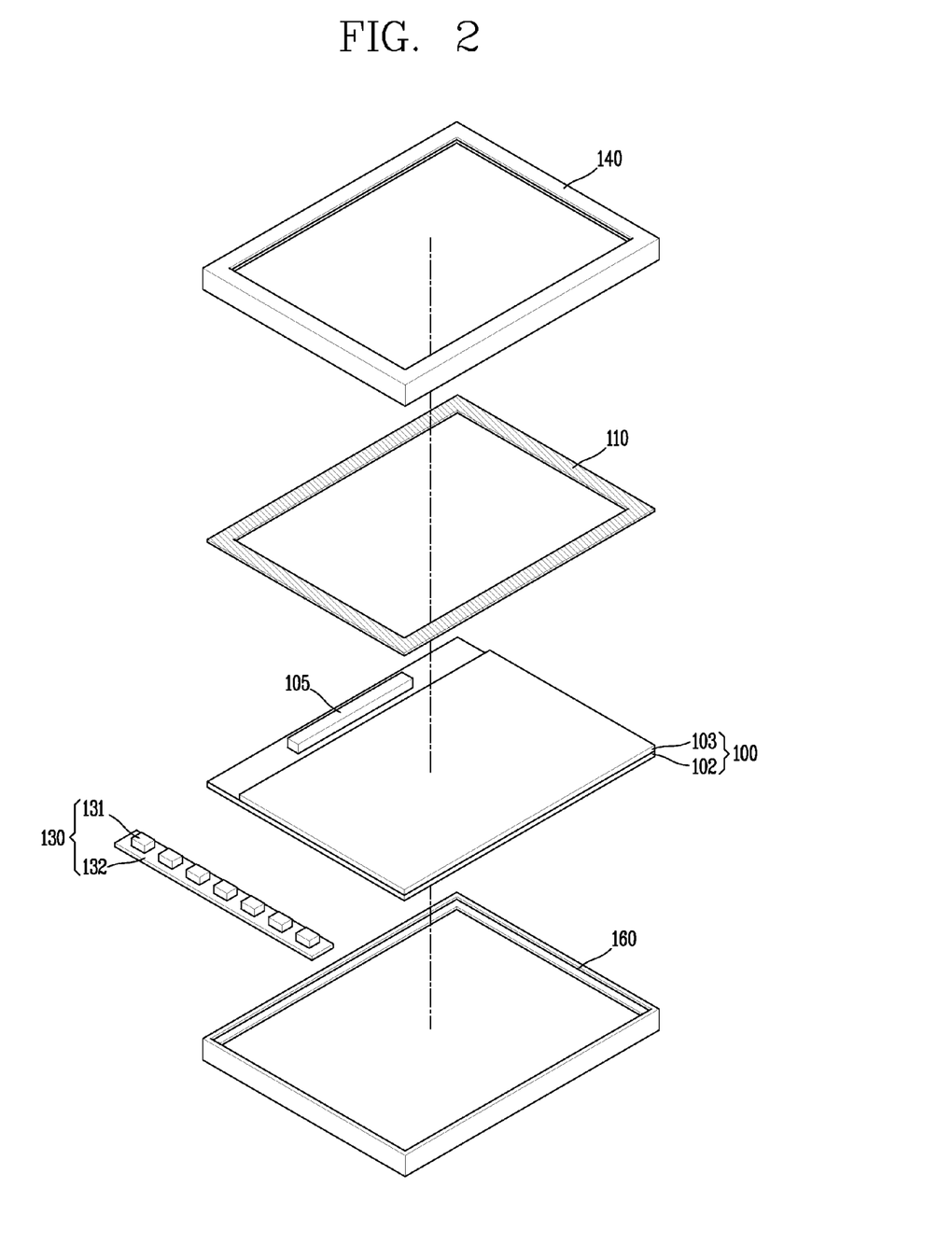
FIG. 2 is a disassembled perspective view of an LCD device module in accordance with an exemplary embodiment of this specification.

FIG. 2 is a disassembled perspective view of an LCD device module in accordance with an example embodiment of this specification. As shown in FIG. 2, an LCD device module may include an LCD panel 100 for presenting an image thereon, a backlight unit 130 for emitting light toward the LCD panel 100, and a supporting structure 140, 160 for securing and supporting the LCD panel 100 and the backlight unit 130.

The LCD panel 100 may be configured so that a lower substrate 102 and an upper substrate 103 are bonded to each other with a predetermined spacing therebetween and a liquid crystal (LC) layer in a cholesteric phase is interposed therebetween. With this configuration, as a signal is applied from a driver IC 105 located at one end of the LCD panel 100, light transmittance of the LC layer changes, thereby generating an image.

The lower substrate 102 may include thin film transistors (TFTs) as switching devices, various types of lines and pixel electrodes. The driver IC 105 may be disposed on one side of the lower substrate 102 to be electrically connected to the lines. FIG. 2 illustrates a Chip on Glass (COG) type drive IC 105 that is directly mounted on the lower substrate 102. Alternatively, a Tape Automated Bonding (TAB) type driver IC (where a driver IC is mounted on a film) may be attached on the lower substrate 102.

The drive IC 105 may include a gate driver for providing a scan signal to turn on/off the TFT of the LCD panel 100, and a data driver for providing a data signal to the pixel electrode. The gate driver may be a Gate In Panel (GIP) type. This type of gate driver may be formed, in a TFT form, at one end of the LCD panel 100 other than the driver IC 105.

Hereinafter, the LCD panel 100 is described in more detail. A plurality of gate lines and data lines may be formed on the lower substrate 102 in horizontal and vertical directions, respectively, and pixel regions may be defined at intersections between the gate lines and the data lines. Also, a TFT functioning as a switching device may be disposed on each pixel region. The TFT may include a gate electrode connected to the gate line, a semiconductor layer formed of amorphous silicon or poly silicon and located on the gate electrode, and source and drain electrodes both formed on the semiconductor layer and electrically connected to the data line and the pixel electrode.

The upper substrate 103 may include common electrodes facing the pixel electrodes. The common electrodes may be formed on the upper substrate in a vertical electrical field driving mode such as a Twisted Nematic (TN) mode, Vertical Alignment (VA) mode or the like.

The upper and lower substrates configured in this manner may be bonded to face each other by use of a sealant formed along edges of an image display region, and cholesteric liquid crystal may then be injected therein to implement the LCD panel 100.

The cholesteric liquid crystal has a property of changing into a planar state (P) in which a helical axis of the liquid crystal is oriented perpendicular to a substrate surface depending on an electric field applied, and a focal conic state (F) in which the helical axis of the liquid crystal is almost in parallel to the substrate surface although it is not constant.

First of all, in the planar state (P), molecules of the liquid crystal have a periodic helical structure and the helical axis has a direction perpendicular to the substrate surface. The planar state (P) is a transparent state capable of transmitting every light incident onto the LCD panel 100 having the cholesteric liquid crystal layer.

Also, in the focal conic state (F), the helical axis of the liquid crystal is orientated in a random direction, and incident light is partially transmitted, partially being reflected and lightly scattered.

Accordingly, when a high voltage is applied to each electrode of the LCD panel 100, the cholesteric liquid crystal layer changes into the planar state as a first state. The cholesteric liquid crystal layer then becomes transparent enough to transmit all the light incident onto the front/rear surface of the LCD panel 100. Also, when a low voltage is applied to each electrode of the LCD panel 100, the cholesteric liquid crystal layer changes into the focal conic state as a second state so as to become opaque. Consequently, an image is generated by shielding incident light.

The backlight unit 130 is disposed in a space surrounded by the supporting structure 140, 160 and one side surface of the LCD panel 100. The backlight unit 130 may include a plurality of Light Emitting Diode (LED) lamps 131 disposed at a side below the LCD panel 100 for emitting light, and a lamp array 132 on which the LED lamps 131 are bonded. The backlight unit 130 has a structure of emitting light directly onto a side surface of the LCD panel 100 which faces the LED lamps 131, namely, has the form without a light guide plate, a diffusion sheet, a prism sheet and the like, which are included in a sidelight-type backlight unit according to the related art. Although not shown, the backlight unit may further include a lamp housing for mounting the LED lamps 131 and the lamp array 132 therein.

The LED lamps 131 may be a plurality of LED lamps, each emitting one of three primary colors of Red (R), Green (G) and Blue (B). Alternatively, all of the LED lamps may emit white light.

When LED lamps each emit one of the three monochromatic colored light (R, G and B), the monochromatic LED lamps may be alternately aligned with a predetermined interval. Each monochromatic light emitted from the lamp is mixed into a white light and provided to the LC panel 100. On the contrary, when all LED lamps emit the white light, these LED lamps are aligned with a predetermined interval to emit the white light toward the LCD panel 100.

FIG. 2 illustrates the sidelight-type backlight unit where the LED lamps 131 are arranged at one side surface of the LCD panel 100. Alternatively, a structure of arranging LED lamps at both side surfaces may be applicable to the LCD device module of the present disclosure.

The LC panel 100 and the backlight unit 130 may be mounted on a supporting structure for supporting and securing them, as described below in detail.

The LCD panel 100 may be attached onto a top case 140, which is formed in a shape of a rectangular frame, by use of a light shielding tape 110, and received in a protruding portion of a lower guide panel 160. Also, the backlight unit 130 may be disposed at at least one side surface of the LCD panel 100 and mounted onto the guide panel 160.

The top case 140 may obscure every front edge portion of the LCD panel 100, namely, a non-display region of the LCD panel 100 where an image is not presented. The top case 140 may be attached onto the LCD panel 100 by the light shielding tape 110. Here, the light shielding tape 110 may not only serve to secure the LCD panel 100 but also prevent light emitted from the backlight unit 130 from leaking out of the edge portions of the LCD panel 100.

The guide panel 160 may receive the LCD panel 100 and the backlight unit 130 therein, and support every rear edge portion of the LCD panel 100. The guide panel 160 may be mechanically coupled to the top case 140 so as to modularize an LCD device. The guide panel 160 is generally produced by injecting white synthetic resin into a mold, in consideration of reflection of light.

Although not shown, the top case 140 and the guide panel 160 may be coupled to each other via a securing member, such as a screw or the like, for more stable coupling.

With the configuration, the LCD device module may not include the light guide plate which was disposed at the rear surface of the related art LCD panel, such that light can incident directly onto a side surface of the LCD panel, thereby enhancing transparency of a transparent display and luminance of an image displayed on the LCD panel. Hereinafter, a technical conception of this disclosure will be described in more detail with reference to a sectional view of an LCD device module in accordance with a first example embodiment.

Figure 3:
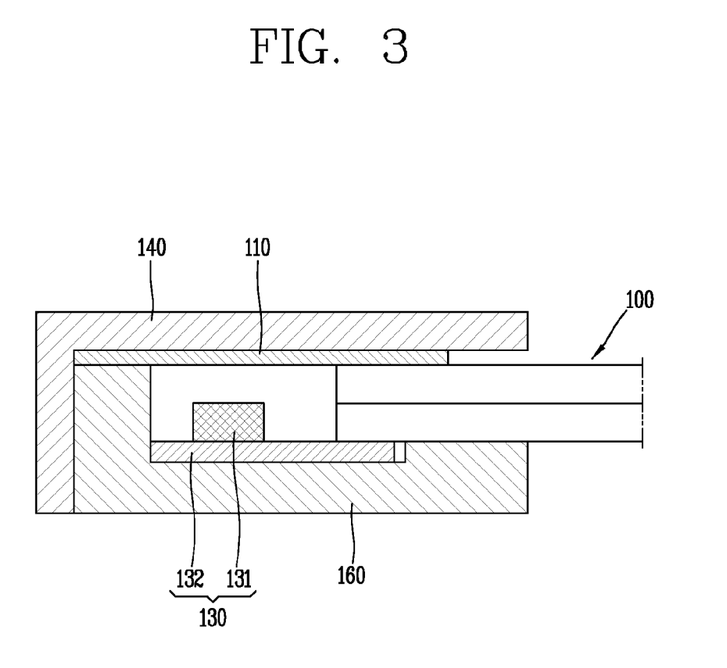
FIG. 3 is a cross-sectional view showing a part of an LCD device module in accordance with a first example embodiment.

FIG. 3 is a sectional view showing a part of an LCD device module in accordance with a first example embodiment. As shown in FIG. 3, an LCD device module with a transparent display in accordance with a first example embodiment may include an LCD panel 100, a backlight unit 130 for emitting light to the LCD panel 100, and supporting structures 140 and 160 for securing and supporting the LCD panel 100 and the backlight unit 130.

In the LCD device module with the transparent display, edge portions of the LCD panel 100 may be supported by a top case 140 and a guide panel 160, and a lamp array 132 having an LED lamp 131 bonded thereon may be located in a space by which the top case 140 and the guide panel 160 are spaced apart from each other. FIG. 3 illustrates the LED lamp 131 whose light emitting surface faces a side surface of the LCD panel 100. Alternatively, the LED lamp 131 may be replaced with an LED lamp as shown in a second example embodiment where a light emitting surface faces a front surface of the LCD panel 100.

The light shielding tape 110 may be disposed at a portion where the top case 140 and the LCD panel 100 are attached to each other, so that the LCD panel 100 can be firmly secured thereon and light emitted from the LED lamp 131 does not leak to the outside.

With the configuration, light emitted from the LED lamp 131 may be incident onto the side surface of the LCD panel 100, and guided by a glass substrate of the LCD panel 100. The guided light may be partially emitted to front and rear surfaces of the LCD panel 100, and partially reflected according to a difference between a refractive index of the glass substrate and a refractive index in the air so as to reflect back into the LCD panel 100. Some of the light reflecting back to the LCD panel 100 may reach an opaque region, which is in a focal conic state implemented by the cholesteric liquid crystal. Consequently, the region may shield the light so as to generate an image. Also, a region where the cholesteric liquid crystal is in a planar state may allow incident light to be fully transmitted therethrough and accordingly become transparent. Therefore, an object located behind the LCD device module may be visible.

Hereinafter, description will be given of an LCD device module in accordance with a second exemplary embodiment with reference to the accompanying drawing.

Figure 4:
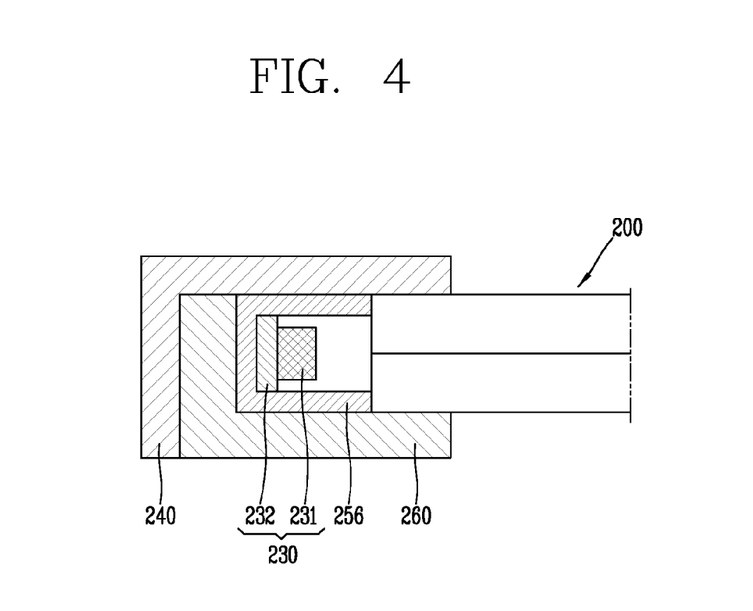
FIG. 4 is a cross-sectional view showing a part of an LCD device module in accordance with a second example embodiment.

FIG. 4 is a sectional view showing a part of an LCD device module in accordance with a second example embodiment. An LCD device module in accordance with the second example embodiment may be different from an LCD device module in accordance with the first example embodiment in that a lamp housing for more enhancing light efficiency and protecting LED lamps is further provided.

As shown in FIG. 4, in an LCD device module having a transparent display in accordance with a second exemplary embodiment, edge portions of an LCD panel 200 may be supported and secured by a top case 240 and a guide panel 260, and a lamp array 232 having an LED lamp 231 bonded thereon may be disposed on an inner side surface of the LCD panel 200. A lower surface of the lamp housing 256 may be received on the inner surface of the lower guide panel 260, and a top surface of the lamp housing 256 may be coupled onto the outer top case 240. That is, the backlight unit 230 is disposed in a space surrounded by the supporting structure 240, 260 and one side surface of the LCD panel 200.

As set forth above, the LED lamp 231 may be bonded onto the lamp array 232 made of a metal or a printed circuit board (PCB). The lamp array 232 may be mounted onto the lamp housing 256 to face a side surface of the LCD panel 200. The lamp housing 256 may be made of a metal having a high reflectivity such that light emitted from the LED lamp 231 can be incident onto the LCD panel 200 more efficiently. This configuration may allow the LED lamp 231 to emit light directly toward the side surface of the LCD panel 200 when being operated and the lamp housing 256 to reflect light emitted from the LED lamp 231 to the LCD panel 200.

With the configuration, the light emitted from the LED lamp 231 and the light reflected by the lamp housing 256 may be incident onto the side surface of the LCD panel 200 so as to be partially emitted to the outside and partially guided by the LCD panel 200 to generate an image according to a state of cholesteric liquid crystal.

Figure 5:
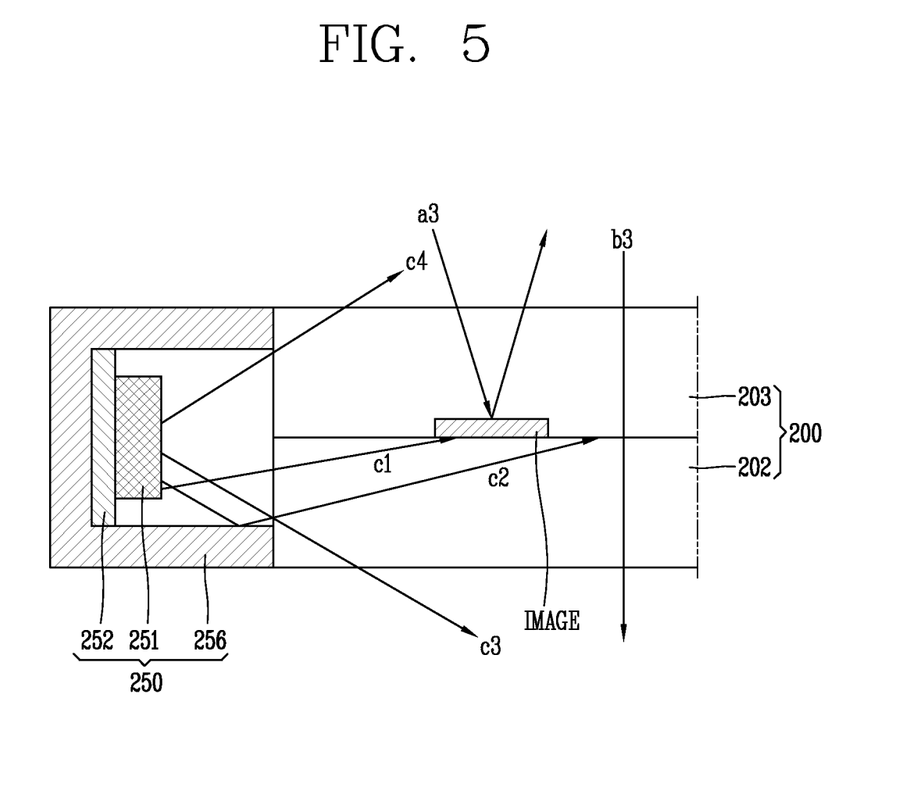
FIG. 5 is a schematic view showing a pattern of light incident onto an LCD panel in an LCD device module in accordance with an example embodiment.

Hereinafter, light incident onto an LCD panel in accordance with an example embodiment is described in detail. FIG. 5 is a schematic view showing a form of light incident onto an LCD panel in an LCD device module in accordance with an example embodiment. As shown in FIG. 5, an LCD panel 200 for an LCD device module may include a lower substrate 202 and an upper substrate 203 bonded to each other with a predetermined spacing therebetween, and a cholesteric liquid crystal layer (not shown) interposed therebetween. At one side surface of the LCD panel 200 a backlight unit which includes an LED lamp 251, and a lamp array 252 having the LED lamp 251 bonded thereon may be disposed. The backlight unit may be mounted inside a lamp housing 256.

With the configuration, incident light from the LED lamp 251 partially goes into the LCD panel 200 directly (e.g., c1) or by being reflected (e.g., c2) by the lamp housing 256, and the rest of light goes to the outside through the lower substrate 202 and the upper substrate 203 (e.g., c3, c4). Here, when the liquid crystal layer located at a predetermined region is converted into a focal conic state in response to a voltage applied to the LCD panel 200, light (e.g., c1) incident on the corresponding region is scattered to generate an image (IMAGE). Therefore, an observer can easily identify the image with naked eyes along a path of light reflected. Here, the light emitted to the outside (e.g., c3, c4) is partially reflected due to a difference in a refractive index between the lower substrate 202 and the upper substrate 203 and the exterior. The partially reflected light may then reflect back into the LCD panel 200 and be guided up to the other surface.

At a region of the LCD panel 200 in a planar state, most of incident light are transmitted through the region (e.g., b3), and therefore, the observer can identify even a region behind the LCD panel 200.

As described above, an LCD device module having a transparent display according to the preferred exemplary embodiments may be configured so that a backlight unit for emitting light is disposed at a side surface of an LCD panel having a cholesteric liquid crystal layer, and a light guide plate, which was disposed at a rear surface of the related art LCD panel, is omitted, resulting in enhancement of transparency and visibility of an image being displayed.

The foregoing embodiments and advantages are merely examples and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A transparent liquid crystal display device comprising:
   a transparent liquid crystal display panel having:
      a lower substrate formed with gate lines and data lines intersecting with the gate lines to form a plurality of pixels for generating an image,
      an upper substrate, and
      a cholesteric liquid crystal layer interposed between the lower substrate and the upper substrate;
   a lamp housing at one side of the transparent liquid crystal display panel, the lamp housing including at least one interior wall;
   a lighting unit attached to the interior wall of the lamp housing, the lighting unit configured to emit light, a part of the emitted light projected directly onto a side surface of the transparent liquid crystal display panel and another part of the emitted light reflected onto the side surface via the top and bottom interior walls; and
   a supporting structure to support and secure the liquid crystal display panel and the lighting unit, the supporting structure having:
      a top case to cover front edges of the liquid crystal display panel but not cover a center portion of the liquid crystal display panel, and
   a guide panel to cover rear edges of the transparent liquid crystal display panel and surround the lamp housing but not cover the center portion of the liquid crystal display panel, the guide panel coupled to the top case; and
   a light shielding tape secured to the upper substrate, the top case and the guide panel.

2. The device of claim 1, wherein the liquid crystal display panel is exposed to outside.

3. The device of claim 1, wherein the supporting structure includes a light shielding tape to secure the top case to the liquid crystal panel.

4. The device of claim 1, wherein the lighting unit comprises:
   one or more light sources; and
   a Light Emitting Diode (LED) array for mounting the light sources in a serially aligned manner.

5. The device according to claim 4, wherein the LED array comprises LEDs emitting lights of different color.

6. The device according to claim 1, wherein the cholesteric liquid crystal layer operates in:
   a first state of transmitting light incident from one surface thereof to the other surface according to an electric field formed; and
   a second state of scattering and reflecting light incident from one surface thereof.

7. The device according to claim 6, wherein the first state indicates that the cholesteric liquid crystal layer is in a planar state, and the second state indicates that the cholesteric liquid crystal layer is in a focal conic state.

8. The device according to claim 1, wherein the upper substrate comprises common electrodes facing the lower substrate.

9. A transparent liquid crystal display device comprising:
   a transparent liquid crystal display panel having:
      a lower substrate formed with gate lines and data lines intersecting with the gate lines to form a plurality of pixels for generating an image,
      an upper substrate, and
      a cholesteric liquid crystal layer interposed between the lower substrate and the upper substrate;

a supporting structure to support and secure the transparent liquid crystal display panel, the supporting structure having:
    a top case to cover front edges of the transparent liquid crystal display panel but not cover a center portion of the transparent liquid crystal display panel, and
    a guide panel to cover rear edges of the transparent liquid crystal display panel but not cover the center portion of the transparent liquid crystal display panel, the guide panel coupled to the top case;
a lighting unit to emit light and secured to the guide panel, a part of the emitted light projected directly onto a side surface of the transparent liquid crystal display panel; and
a light shielding tape secured to the upper substrate, the top case and the guide panel.

10. The transparent liquid crystal display device of claim 9, wherein the lighting unit is secured to an upper surface of the guide panel.

* * * * *